(12) United States Patent
Arulambalam et al.

(10) Patent No.: US 8,218,770 B2
(45) Date of Patent: Jul. 10, 2012

(54) METHOD AND APPARATUS FOR SECURE KEY MANAGEMENT AND PROTECTION

(75) Inventors: Ambalavanar Arulambalam, Macungie, PA (US); David E. Clune, Califon, NJ (US); Nevin C. Heintze, Bethlehem, PA (US); Michael James Hunter, Mertztown, PA (US); Hakan I. Pekcan, Basking Ridge, NJ (US)

(73) Assignee: Agere Systems Inc., Allentown, PA (US)

( * ) Notice: Subject to any disclaimer, the term of this patent is extended or adjusted under 35 U.S.C. 154(b) by 1264 days.

(21) Appl. No.: 11/539,327

(22) Filed: Oct. 6, 2006

(65) Prior Publication Data

US 2007/0195957 A1     Aug. 23, 2007

Related U.S. Application Data

(63) Continuation-in-part of application No. 11/226,507, filed on Sep. 13, 2005, now Pat. No. 7,599,364, and a continuation-in-part of application No. 11/273,750, filed on Nov. 15, 2005, now Pat. No. 7,461,214, and a continuation-in-part of application No. 11/364,979, filed on Feb. 28, 2006, and a continuation-in-part of application No. 11/384,975, filed on Mar. 20, 2006.

(60) Provisional application No. 60/724,692, filed on Oct. 7, 2005, provisional application No. 60/724,464, filed on Oct. 7, 2005, provisional application No. 60/724,462, filed on Oct. 7, 2005, provisional application No. 60/724,463, filed on Oct. 7, 2005, provisional application No. 60/724,722, filed on Oct. 7, 2005, provisional application No. 60/725,060, filed on Oct. 7, 2005, provisional application No. 60/724,573, filed on Oct. 7, 2005.

(51) Int. Cl.
*H04L 29/06* (2006.01)

(52) U.S. Cl. ......... 380/277; 380/278; 713/187; 713/190
(58) Field of Classification Search ................. 380/278; 713/187–190
See application file for complete search history.

(56) References Cited

U.S. PATENT DOCUMENTS 5,243,596 A    9/1993   Port et al.
(Continued)

FOREIGN PATENT DOCUMENTS

EP    1691526    8/2006

OTHER PUBLICATIONS

Christoforos, "Analysis of a Reconfigurable Network Processor", 2006, Parallel and Distributed Processing Symposium.*

(Continued)

*Primary Examiner* — Taghi Arani
*Assistant Examiner* — Gregory Lane

(57) ABSTRACT

Described embodiments provide a server for transferring data packets of streaming data sessions between devices. The server includes an accelerator that, for received data packets, i) extracts header fields of the packets, ii) determines, based on the header fields, a destination for the packets, and iii) provides the packets to the destination. For data to be transmitted, the accelerator i) groups the data into packets, ii) generates header fields for the packets, and iii) provides the packets to the network. A memory arbiter manages accesses to memory that buffers data and stores keys corresponding to the data sessions. A storage medium stores media files corresponding to the data sessions. A key manager includes i) a first memory for storing a master key of the server, ii) a second memory for storing one or more keys corresponding to the data sessions, and iii) a processor to encrypt and decrypt data.

15 Claims, 7 Drawing Sheets

U.S. PATENT DOCUMENTS

| | | | |
|---|---|---|---|
| 5,371,877 | A | 12/1994 | Drako et al. |
| 5,553,269 | A | 9/1996 | Nunes |
| 5,659,687 | A | 8/1997 | Kim et al. |
| 5,684,954 | A | 11/1997 | Kaiserswerth et al. |
| 5,937,169 | A | 8/1999 | Connery et al. |
| 5,974,482 | A | 10/1999 | Gerhart |
| 6,233,224 | B1 | 5/2001 | Yamashita et al. |
| 6,434,651 | B1 | 8/2002 | Gentry |
| 6,449,656 | B1 | 9/2002 | Elzur et al. |
| 6,453,394 | B2 | 9/2002 | Miki et al. |
| 6,643,259 | B1 | 11/2003 | Borella et al. |
| 6,697,868 | B2 | 2/2004 | Craft et al. |
| 6,732,252 | B2 | 5/2004 | Miki et al. |
| 6,788,704 | B1 | 9/2004 | Lindsay |
| 6,868,459 | B1 | 3/2005 | Stuber |
| 6,876,941 | B2 | 4/2005 | Nightingale |
| 6,885,673 | B1 | 4/2005 | Tzeng et al. |
| 6,901,072 | B1 | 5/2005 | Wong |
| 6,920,510 | B2 | 7/2005 | Chang et al. |
| 6,938,097 | B1 | 8/2005 | Vincent et al. |
| 7,035,291 | B2 | 4/2006 | Grinfeld |
| 7,085,866 | B1 | 8/2006 | Hobson et al. |
| 7,185,266 | B2 | 2/2007 | Blightman et al. |
| 7,236,492 | B2 | 6/2007 | Davis et al. |
| 7,287,102 | B1 | 10/2007 | White et al. |
| 2002/0038379 | A1 | 3/2002 | Sato et al. |
| 2002/0080780 | A1 | 6/2002 | McCormick et al. |
| 2002/0194363 | A1 | 12/2002 | Jha |
| 2003/0041163 | A1* | 2/2003 | Rhoades et al. ............ 709/232 |
| 2003/0067934 | A1 | 4/2003 | Hooper et al. |
| 2003/0086395 | A1 | 5/2003 | Shanbhag |
| 2003/0112802 | A1* | 6/2003 | Ono et al. ............ 370/389 |
| 2004/0019789 | A1* | 1/2004 | Buer ............ 713/170 |
| 2004/0042483 | A1 | 3/2004 | Elzur et al. |
| 2004/0133713 | A1 | 7/2004 | Elzur |
| 2004/0148512 | A1* | 7/2004 | Park et al. ............ 713/193 |
| 2004/0153578 | A1 | 8/2004 | Elzur |
| 2004/0153642 | A1* | 8/2004 | Plotkin et al. ............ 713/150 |
| 2004/0165538 | A1 | 8/2004 | Swami |
| 2004/0249957 | A1 | 12/2004 | Ekis et al. |
| 2005/0021680 | A1 | 1/2005 | Ekis et al. |
| 2005/0108555 | A1* | 5/2005 | Sibert ............ 713/187 |
| 2005/0132226 | A1* | 6/2005 | Wheeler et al. ............ 713/201 |
| 2005/0165985 | A1 | 7/2005 | Vangal et al. |
| 2005/0213768 | A1* | 9/2005 | Durham et al. ............ 380/278 |
| 2006/0085652 | A1* | 4/2006 | Zimmer et al. ............ 713/193 |
| 2006/0089994 | A1* | 4/2006 | Hayes ............ 709/227 |
| 2006/0179309 | A1* | 8/2006 | Cross et al. ............ 713/168 |
| 2006/0218527 | A1* | 9/2006 | Nagendra ............ 717/117 |
| 2006/0227811 | A1* | 10/2006 | Hussain et al. ............ 370/503 |
| 2006/0288235 | A1* | 12/2006 | Goto ............ 713/190 |
| 2008/0019529 | A1* | 1/2008 | Kahn et al. ............ 380/281 |

OTHER PUBLICATIONS

ARM, AMBA AXI Protocol v1.0 Specification, 2003 108 pages.

Tanenbaum, Andrew S., Structured Computer Organization, 1984, Prentice-Hall, Inc. pp. 10-12.

Information Sciences Institute, University of Southern California, Transmission Control Protocol Darpa Internet Program Protocol Specification, Sep. 1981, pp. 1-88, Marina del Rey, CA.

ARM, AMBA Specification, Rev. 2.0, ARM Ltd., 1999, 230 pages.

ARM926EJ-S Technical Reference Manual, ARM Ltd., 2001, 200 pages.

Specification for the Advanced Encryption Standard (AES), Federal Information Processing Standard (FIPS) Publication 197, (2001).

* cited by examiner

10

METHOD AND APPARATUS FOR SECURE KEY MANAGEMENT AND PROTECTION

CROSS-REFERENCE TO RELATED APPLICATIONS

This application is a continuation in part of U.S. patent application Ser. No. 11/226,507, filed Sep. 13, 2005 now U.S. Pat. No. 7,599,364, and is a continuation in part of U.S. patent application Ser. No. 11/273,750, filed Nov. 15, 2005 now U.S. Pat. No. 7,461,214, and is a continuation in part of U.S. patent application Ser. No. 11/364,979, filed Feb. 28, 2006, and is a continuation in Part of U.S. patent application Ser. No. 11/384,975, filed Mar. 20, 2006, and claims the benefit of U.S. provisional patent application Nos. 60/724,692, filed Oct. 7, 2005, 60/724,464, filed Oct. 7, 2005, 60/724,462, filed Oct. 7, 2005, 60/724,463, filed Oct. 7, 2005, 60/724,722, filed Oct. 7, 2005, 60/725,060, filed Oct. 7, 2005, and 60/724,573, filed Oct. 7, 2005, all of which applications are expressly incorporated by reference herein in their entireties.

BACKGROUND OF THE INVENTION

1. Field of the Invention

The present invention relates to security mechanisms for network attached media streaming systems.

2. Description of Related Art

Current and emerging digital rights management (DRM) solutions include multi-level key management solutions. Keys used for Encryption/Decryption are derived from various intermediate keys to ultimately determine a title key for a media file. As an example, a master key will unlock a device key and, using the device key, a media key is unlocked. Using this media key, a title key is discovered. In this process it is important that the decrypted keys are not exposed to users or processes outside the device to be used by a hacker.

Often, conventional approaches used a completely software-based approach in which the decryption keys were protected by software. Other approaches employed hardware assisted methods which exposed the keys. Exposed keys might provide backdoor access for a hacker, allowing the keys to become compromised.

SUMMARY OF THE INVENTION

Embodiments of the present invention provide a server for transferring data packets of streaming data sessions between playback devices. The server includes a protocol accelerator that, for received data packets, i) extracts header fields of the packets, ii) determines, based on the header fields, a destination for the packets, and iii) provides the packets to the destination. For data to be transmitted, the protocol accelerator i) groups the data into packets, ii) generates header fields for the packets, and iii) provides the packets to the network. A control processor processes data. A memory arbiter manages accesses to shared memory that buffers data and stores keys corresponding to the data sessions. A storage medium stores media files corresponding to the data sessions. A key manager includes i) a first memory for storing a master key of the server, ii) a second memory for storing one or more keys corresponding to the data sessions, and iii) a processor to encrypt and decrypt data.

DETAILED DESCRIPTION

This description of the exemplary embodiments is intended to be read in connection with the accompanying drawings, which are to be considered part of the entire written description.

Figure 1:
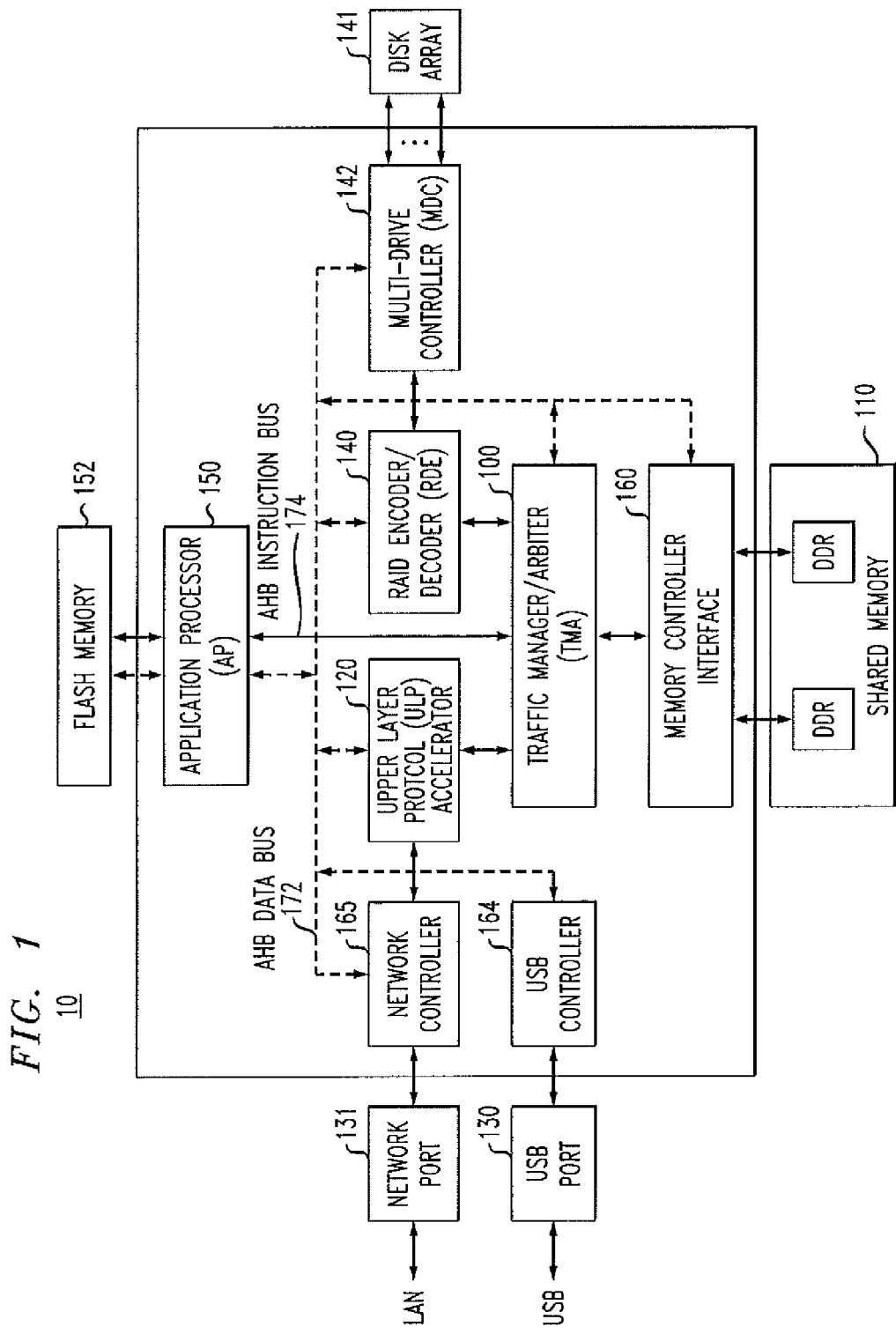
FIG. 1 is a block diagram of an exemplary network attached server (NAS) system for streaming media in accordance to embodiments of the present invention.

FIG. 1 is a block diagram of an exemplary home media server and network attached storage (NAS) system 10 for a home media server application, which might be implemented as a system on a chip (SOC). NAS system 10 is connected to input sources, such as via USB port 130 or network port 131, and one or more mass storage devices, such as a hard disk drive (HDD) array 141. In NAS system 10, data from multiple sessions are concurrently stored to disk array 141, or played out to devices (e.g., PCs, TVs, digital video recorders (DVRs), personal video recorders (PVRs), and the like, not shown) on a home network via USB port 130 or network port 131. USB port 130 and network port 131 might also be used for control traffic. The term "session" broadly encompasses any open connection that has activity. For example, a receive session is a connection in which data is being received from a media device, reassembled and stored in disk array 141 (or other mass storage device), and a transmit session is a connection in which data is being read out from disk array 141 to a media device (e.g., TV, stereo, computer or the like) for playback. A control session is a connection in which data is transferred between a network and application processor (AP) 150 for processor functions that operate NAS system 10 (e.g., retrieving data or instructions from shared memory 110, reading from or writing to registers). The sessions use a shared memory 110 as an intermediate storage medium.

AP 150 might be an embedded ARM926EJ-S core by ARM Holdings, plc, Cambridge, UK, or any other embedded microprocessor. In FIG. 1, AP 150 is coupled to other elements of the system by at least one of two different buses: instruction bus 174 and data bus 172. In some embodiments, both instruction and data buses 174 and 172 are AMBA AHB buses. AP 150 is coupled to Traffic Manger Arbitrator (TMA) 100 and flash memory 152 via instruction bus 174 and data bus 172. TMA 100 includes an exemplary memory controller interface 160. TMA 100 manages i) storage of media streams arriving via network port 131, ii) handling of control traffic for application processing, and iii) playback traffic during retrieval from HDD array 141. TMA 100 controls the flow of all traffic among the network controller 165, USB controller 164, AP 150, HDD array 141, and shared memory 110.

In some embodiments, shared memory 110 is implemented by a single-port DDR-2 DRAM. Double Data Rate (DDR) synchronous dynamic random access memory (SDRAM) is a high-bandwidth DRAM technology. Other types of memory might be used to implement shared memory 110. In some embodiments, disk array 141 is implemented as a 4-channel Serial Advanced Technology Attachment (SATA) hard disk array, although other types of storage devices, such as Parallel Advanced Technology Attachment (PATA) hard disks, optical disks, or the like might be employed.

AP 150 is also coupled, via a data bus 172, to Gigabit Ethernet media access control (GbE MAC) network controller 165, Upper Layer Protocol (ULP) accelerator 120, RAID decoder/encoder (RDE) module 140 (where RAID denotes redundant array of inexpensive disks), USB controller 164 and multi drive controller (MDC) 142.

AP 150 accesses shared memory 110 for several reasons. Part of shared memory 110 might generally contain program instructions and data for AP 150. AHB Instruction Bus 174 might access shared memory 110 to get instruction/program data on behalf of AP 150. Also, the control traffic destined for AP 150 inspection is stored in shared memory 110. In some embodiments, AHB instruction bus 174 has read access to shared memory 110, but the AHB data bus 172 is provided both read and write access to memory 110. AP 150 uses the write access to AHB data bus 172 to re-order data packets (e.g., TCP packets) received out-of-order. Also, AP 150 might insert data in and extract data from an existing packet stream in the shared memory 110.

AHB data bus 172 and AHB instruction bus 174 access shared memory 110 on behalf of AP 150 frequently. AHB data bus 172 is primarily used to access the internal register space and to access the data portion of the external shared memory. AHB instruction bus 174 is used to access instructions specific to AP 150, that are stored in shared memory 110. NAS system 10 receives media objects and control traffic from network port 131 and the objects/traffic are first processed by the local area network controller (e.g., Gigabit Ethernet controller GbE MAC 165) and ULP accelerator 120. ULP accelerator 120 transfers the media objects and control traffic to TMA 100, and TMA 100 stores the arriving traffic in shared memory 110. In the case of media object transfers, the incoming object data are temporarily stored in shared memory 110, and then transferred to RDE 140 for storage in disk array 141. TMA 100 also manages the retrieval requests from disk array 141 toward network port 131. While servicing media playback requests, data is transferred from disk array 141 and stored in buffers in shared memory 110. The data in the buffers is then transferred out to network controller 165 via ULP accelerator 120. The data are formed into packets for transmission using TCP/IP, with ULP accelerator 120 performing routine TCP protocol tasks to reduce the load on AP 150.

ULP accelerator 120 might generally offload routine TCP/IP protocol processing from AP 150. For example, ULP accelerator 120 might perform routine, high frequency calculations and decisions in hardware in real-time, while transferring infrequent, complex calculations and decisions to AP 150. ULP accelerator 120 might handle communication processing for most packets. For received packets, ULP accelerator 120 might extract one or more header fields of a received packet and perform a lookup to determine a destination for the received packet. ULP accelerator 120 might also tag a received packet from a previously-established connection with a pre-defined Queue Identifier (QID) used by TMA 100 for traffic queuing. ULP accelerator 120 might route packets received from new or unknown connections to AP 150 for further processing. Thus, ULP accelerator 120 provides a received packet to either i) disk array 141 via RDE 140 if the packet contains media content from a previously-established connection, or ii) AP 150 for further processing if the packet contains a control message or the packet is not recognized by ULP accelerator 120. In either case, TMA 100 might temporarily buffer received packets in shared memory 110.

For transmitted packets, ULP accelerator 120 receives a data transfer request from TMA 100. The source of data might be disk array 141 (for a media stream), AP 150 (for a control message), or ULP accelerator 120 itself (for a TCP acknowledgement packet). Regardless of the packet source, ULP accelerator 120 might encapsulate an Ethernet header (e.g., a TCP header and an IP header) for each outgoing packet and then provide each packet to network interface 165 or USB controller 164.

Figure 2:
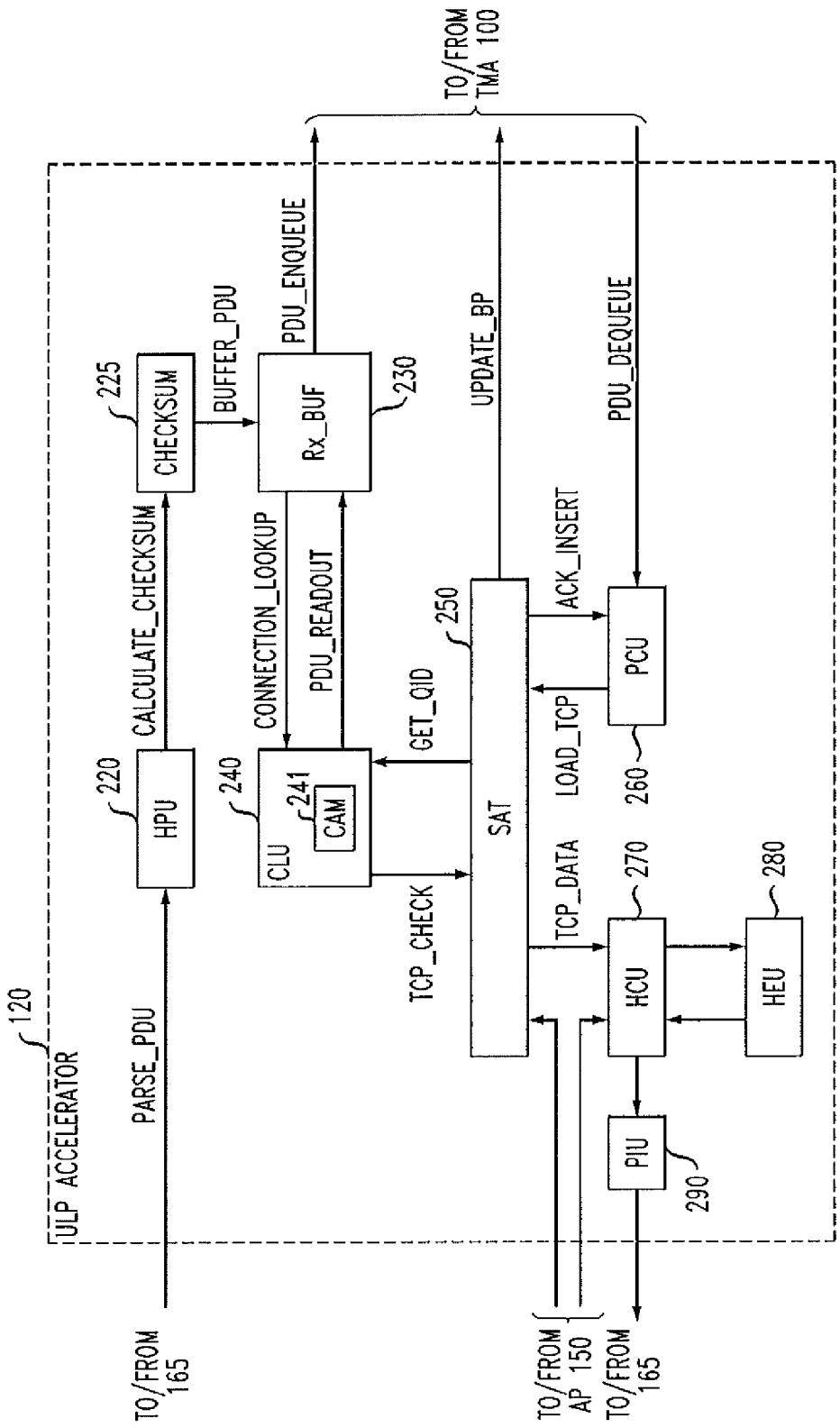
FIG. 2 is a block diagram of an exemplary ULP accelerator of the system shown in FIG. 1.

FIG. 2 shows greater detail of ULP accelerator 120 in NAS system 10. As shown in FIG. 2, NAS system 10 includes two separate data paths: a receive data path and a transmit data path. The receive path carries traffic from external devices, for example, via network controller 165 or USB controller 164, to TMA 100. The transmit path carries traffic from disk array 141 to external devices, for example, via network controller 165 or USB controller 164.

In the receive data path, ULP accelerator 120 receives packets, for example, Ethernet packets from network controller 165 or USB packets from USB controller 164. The L3 and L4 header fields of each packet are extracted by ULP accelerator 120. ULP accelerator 120 performs a connection lookup and decides where to send the received packet. An arriving packet from a previously-established connection is tagged with a pre-defined Queue ID (QID) used by TMA 100 for traffic queuing purposes.

A packet from a new or unknown connection might require inspection by AP 150. ULP accelerator 120 might tag the packet with a special QID and route the packet to AP 150. The final destination of an arriving packet after ULP accelerator 120 is either disk array 141 for storage (if the packet carries media content), or AP 150 for further processing (if the packet carries a control message or is not recognized by ULP accelerator 120). In either ease, TMA 100 sends the packet to shared memory 110 for temporary buffering. To maintain streaming bandwidth, media data might be transferred between a client (not shown) and NAS system 10 in a bulk data transfer that is handled by hardware without processing by AP 150. In embodiments of the present invention, a bulk data transfer might be performed such as described in related U.S. patent application Ser. No. 11/364,979, filed Feb. 28, 2006.

In the transmit data path, ULP accelerator 120 receives a data transfer request from TMA 100. The source of data to be transferred might be disk array 141 (for a media stream), or ULP accelerator 120 itself (for control data, such as a TCP acknowledgement packet). Regardless of the traffic source, ULP accelerator 120 encapsulates an Ethernet header, an L3 (IP) header and an L4 (TCP) header for each outgoing packet and then sends the packet to one or more external devices, for example, via network controller 165 or USB controller 164, based on the destination port specified. In general, there are three sources for initiating data transmissions: 1) AP 150 can insert packets for transmission when necessary; 2) TMA 100 can stream data from disk array 141; and 3) ULP accelerator 120 can insert an acknowledge (ACK) packet when a timer expires. In the first two cases, data is forwarded to ULP accelerator 120 from TMA 100. In the third case, SAT 150 generates the data transfer request to ULP accelerator 120.

As shown in FIG. 2, ULP accelerator 120 processes received network packets in Header Parsing Unit (HPU) 220, which parses incoming data packets (PDUs), as indicated by signal PARSE_PDU, to determine where the L3 and L4 packet headers start, and delineates the packet boundary between different protocol levels by parsing the packet content. Checksum block 225 performs an L3 and L4 checksum on the incoming data packets to check packet integrity, as indicated by signal CALCULATE_CHECKSUM. Receive Buffer (RX_Buf) 230 buffers incoming packets for use by ULP accelerator 120, as indicated by signal BUFFER_PDU. TMA 100 is coupled to ULP accelerator 120, to provide ULP accelerator 120 with an interface to, for example, shared memory 110, as indicated by signals PDU_ENQUEUE, for placing data packets in a corresponding queue buffer, UPDATE_BP for updating one or more corresponding pointers of the queue buffer, such as a read or write pointer, and PDU_DEQUEUE, for removing data packets from a corresponding queue buffer.

Connection look-up unit (CLU) 240 is provided with received network data and extracts L3 and L4 fields to form a lookup address, as indicated by signal CONNECTION LOOKUP, and maintains parameters that uniquely identify an established connection, for example a Connection ID (CID) in a connection table for use by AP 150 in locating buffer space in shared memory 110 corresponding to each connection. CLU 240 might use the L3 and L4 fields to form a look-up address for content addressable memory (CAM) 241. CAM 241 stores parameters that uniquely identify an established connection. An index of matched CAM entries provides a CID for look-up in the connection table. The queue ID (QID) used by TMA 100 to identify a queue buffer might generally be one of the connection parameters maintained by CLU 240. CAM 241 allows real-time extraction of the QID within the hardware of ULP accelerator 120, as indicated by signal GET_QID. If an incoming packet does not match an entry in CAM 241, ULP accelerator 120 provides the packet to AP 150 for further processing.

Payload collection unit (PCU) 260 collects traffic from TMA 100 for transmission. Header encapsulation unit (HEU) 280 includes an encapsulation table of template L2, L3 and L4 headers to be added to each outgoing packet. Header Construction Unit (HCU) 270 builds the packet header according to the encapsulation table of HEU 280. Packet Integration Unit (PIU) 290 assembles a packet by combining packet header data and payload data to form outgoing packets. AP 150 controls the setup of ULP accelerator 120.

Sequence and Acknowledgement Table (SAT) 250 maintains a SAT table to track incoming packet sequence numbers and acknowledgement packets for received and transmitted data packets. The SAT table might be used for TCP/IP connections, or other connection oriented protocols. SAT 250 performs transport layer processing, for example, protocol specific counters for each connection and the remaining object length to be received for each CID. In general, SAT 250 might also offload most TCP operations from AP 150, for example, updating sequence numbers, setting timers, detecting out-of-sequence packets, recording acknowledgements, etc., as indicated by signals TCP_DATA, LOAD_TCP and ACK_INSERT. In embodiments of the present invention, ULP accelerator 120 might be implemented such as described in related U.S. patent application Ser. Nos. 11/226,507, filed Sep. 13, 2005 and 11/384,975, filed Mar. 20, 2006.

TMA 100 manages i) storage of media streams arriving via network port 131, ii) handling of control traffic for application processing, and iii) playback traffic during retrieval from disk array 141. TMA 100 controls the flow of all traffic among network controller 165, USB controller 164, shared memory 110, AP 150, and disk array 141. TMA 100 manages data storage to and retrieval from disk array 141 by providing the appropriate control information to RDE 140. Control traffic destined for inspection by AP 150 is also stored in shared memory 110, and AP 150 can read packets from shared memory 110. AP 150 also re-orders any packets received out of order. A portion of shared memory 110 and disk array 141 might be employed to store program instructions and data for AP 150. TMA 100 manages the access to shared memory 110 and disk array 141 by transferring control information from the disk to memory and memory to disk. TMA 100 also enables AP 150 to insert data and extract data to and from an existing packet stream stored in shared memory 110.

Figure 3:
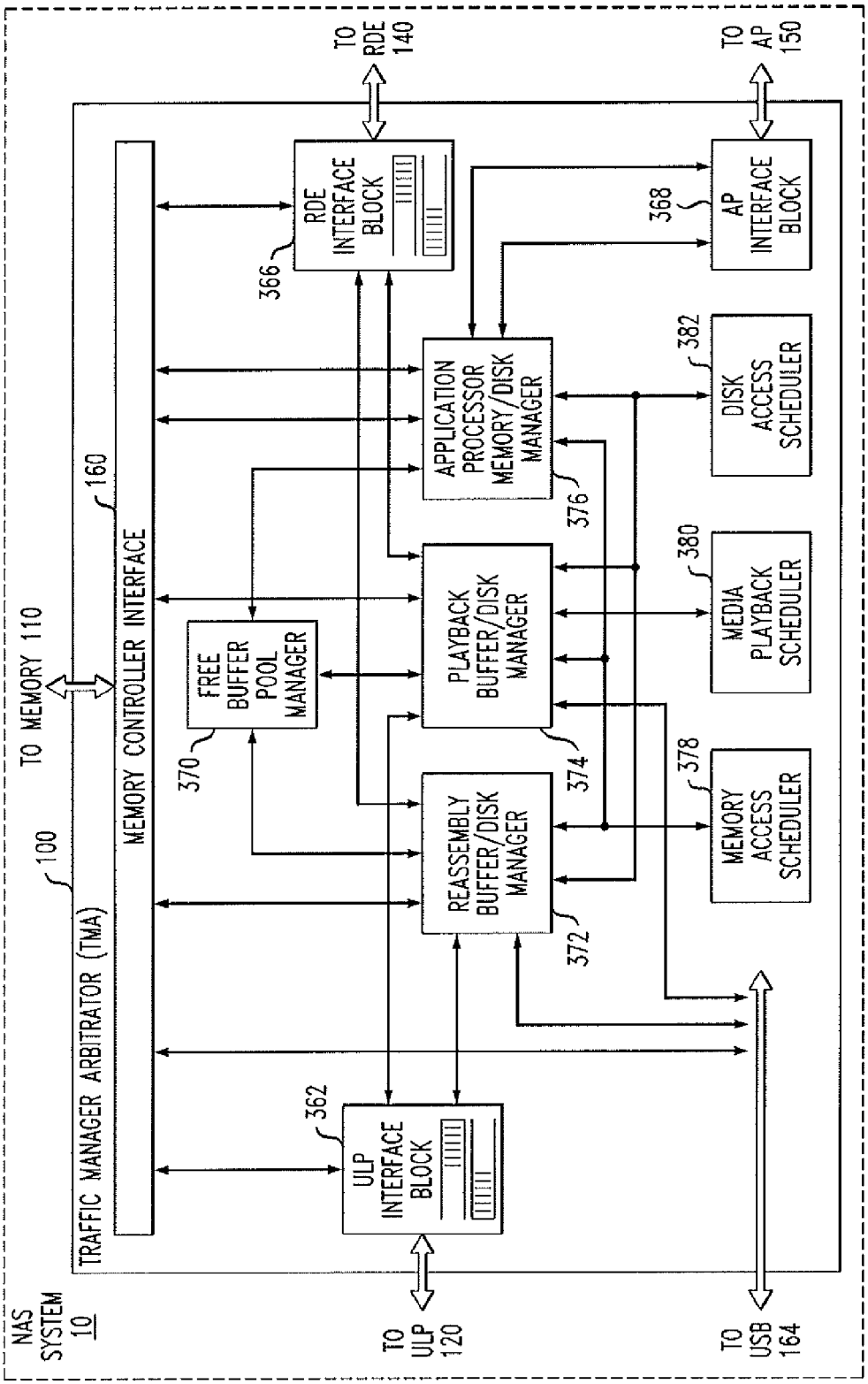
FIG. 3 is a block diagram of an exemplary TMA module of the system shown in FIG. 1.

TMA 100 is shown in greater detail in FIG. 3. TMA 100 interfaces to at least five modules/devices: 1) shared memory 110; 2) ULP accelerator 120, which might also interface to a network controller (e.g., 165); 3) USB controller 164; 4) one or more non-volatile storage devices, for example, disk array 141; and 5) AP 150. Memory controller interface 160 provides the interface for managing accesses to shared memory 110 via a single memory port, such as described in related U.S. patent application Ser. No. 11/273,750, filed Nov. 15, 2005. As shown in FIG. 3, TMA 100 includes memory controller interface 160, buffer managers 370, 372, 374 and 376 that handle memory buffer and disk management, and schedulers 378, 380 and 382 that allocate the available memory access bandwidth of shared memory 110. Reassembly buffer/disk manager (RBM) 372 manages the transfer of control packets or packetized media objects from network port 131 to shared memory 110 for reassembly, and then, if appropriate, the transfer of the control packets or packetized media objects to disk array 141. Media playback buffer/disk manager (PBM) 374 manages the transfer of data out of disk array 141 to shared memory 110, and then the transfer of data from shared memory 110 to ULP accelerator 120 or USB controller 164 during playback. Application processor memory manager (AMM) 376 provides an interface for AP 150 to disk array 141 and shared memory 110.

Free buffer pool manager (FBM) 370 allocates and de-allocates buffers when needed by the RBM 372, PBM 374 or AMM 376, and maintains a free buffer list, where the free buffer list might be stored in a last-in, first-out (LIFO) queue. Memory access scheduler (MAS) 378, media playback scheduler (MPS) 380, and disk access scheduler (DAS) 382 manage the shared resources, such as memory access bandwidth and disk access bandwidth. Schedulers 378, 380 and 382 also provide a prescribed quality of service (QoS), in the form of allocated bandwidth and latency guarantees for media objects during playback. MAS 378 provides RBM 372, PBM 374 and AMM 376 guaranteed memory access bandwidth. MPS 380 arbitrates among multiple media transfer requests and provides allocated bandwidth and ensures continuous playback without any interruption. DAS 382 provides guaranteed accesses to the disk for the re-assembly process, playback process and access by AP 150.

MAS 378 manages bandwidth distribution among each media session, while memory controller interface 160 manages all memory accesses via a single memory port of shared memory 110. MAS 378 and memory controller interface 160 of TMA 100 work together to make efficient and effective use of the memory access resources. MAS 378 might generally provide a prescribed QoS (by pre-allocated time slots and round-robin polling) to a plurality of data transfer requests having different request types. Each of the various types of media streams involves a respectively different set of data transfers to and from shared memory 110 that are under control of MAS 378. For example, memory write operations include i) re-assembly media write, ii) playback media write, iii) application processor data transfer from disk array 141 to shared memory 110, and iv) application processor write memory operations. Memory read operations include i) re-assembly read, ii) playback media read, iii) application processor data transfer from shared memory 110 to disk array 141, and iv) application processor read memory operations.

The re-assembly media write process might typically include four steps: 1) receiving data from network port 131 or USB port 130; 2) writing the data to shared memory 110; 3) reading the data from shared memory 110; and 4) writing the data to disk array 141. The playback media read process might typically include four steps: 1) accessing and receiving data from disk array 141; 2) writing the data to shared memory 110; 3) reading the data from shared memory 110; and 4) sending the data to network port 131 or USB port 130.

The application processor data transfer from memory 110 to disk array 141 might typically include two steps: 1) reading the data from shared memory 110; and 2) writing the data to disk array 141. Similarly, the application processor data transfer from disk array 141 to shared memory 110 might typically include two steps: 1) reading the data from disk array 141; and 2) writing the data to shared memory 110. Further, AP 150 might write to or read from shared memory 110 directly without writing to or reading from disk array 141.

Thus, as described herein, NAS system 10 receives media objects and control traffic from network port 131 and the objects/traffic are first processed by network controller 165 and ULP accelerator 120. ULP accelerator 120 transfers the media objects and control traffic to TMA 100, and TMA 100 stores the arriving traffic in shared memory 110. In the case of media object transfers, the incoming object data is temporarily stored in shared memory 110, and then transferred to RDE 140 for storage in disk array 141. TMA 100 also manages retrieval requests from disk array 141 toward network port 131. While servicing media playback requests, data is transferred from disk array 141 and buffered in shared memory 110. The data is then transferred out to network port 131 via ULP accelerator 120, which forms the data into packets for transmission using TCP/IP. TMA 100 manages the storage to and retrieval from disk array 141 by providing the appropriate control information to RDE 140. In embodiments of the present invention, TMA 100 might be implemented such as described in related U.S. patent application Ser. No. 11/273,750, filed Nov. 15, 2005.

Digital Rights Management ("DRM") solutions typically employ secure key processing to decrypt media files played on home media players to prevent the overall digital rights management from being compromised. Embodiments of the present invention might provide a localized key protection mechanism employing a hardware-based key management engine, and a subsystem for accelerated encryption/decryption of media content.

Figure 4:
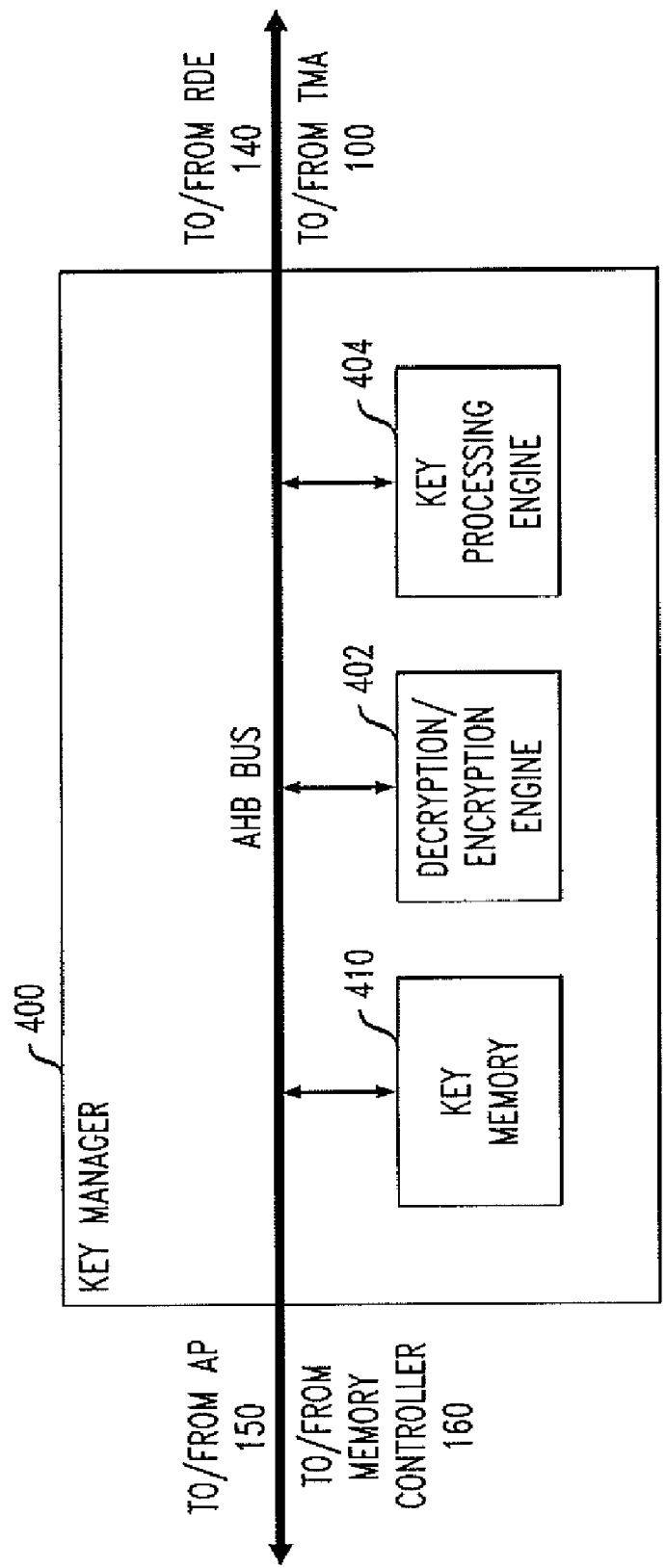
FIG. 4 is a block diagram of a secure key management system in accordance with embodiments of the present invention.

FIG. 4 shows an example of a system in which the keys are managed primarily in hardware, thus prohibiting any outside entity from gaining access to these keys. The exemplary secure key manager 400 includes key memory 410, key processing engine 404, and encryption/decryption engine 402. Key processing engine 404 might be implemented as a direct memory access (DMA) engine such as, for example an ARM PrimeCell PL080 by ARM Holdings, plc of Cambridge, UK, although other implementations might be employed. Encryption/Decryption Engine 402 might be implemented as an Advanced Encryption Standard (AES) core, such as a CS5210-40 core by Conexant Systems, Inc., Newport Beach, Calif., although other encryption/decryption engines and other encryption/decryption algorithms might be employed. As shown in FIG. 4, key manager 400 might be coupled to an Advanced Microcontroller Bus Architecture (AMBA) Advanced High-performance Bus (AHB), but any suitable type of data bus might be employed. Via the AHB Bus, key manager 400 might be in communication with other components of NAS system 10 shown in FIG. 1, such as AP 150, Memory Controller 160, RDE 140 and TMA 100.

Figure 5:
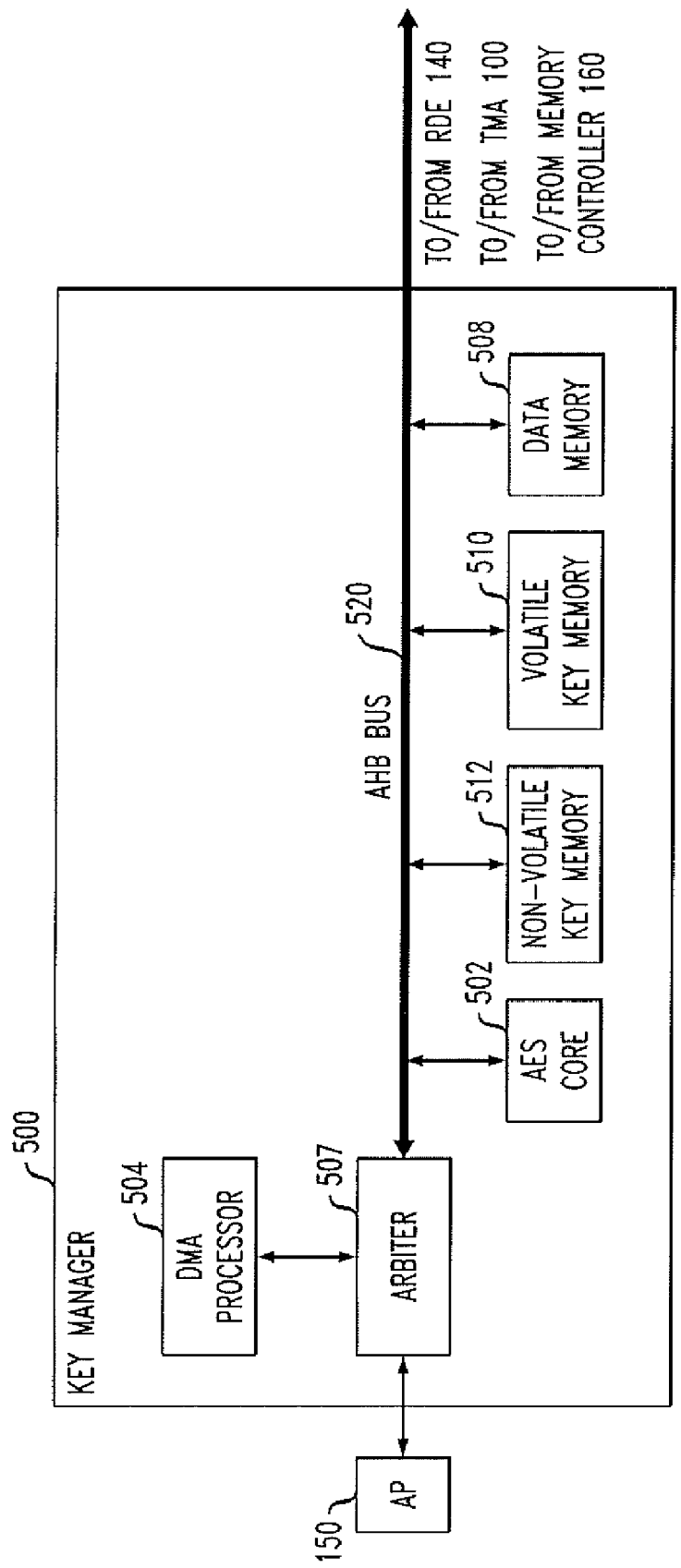
FIG. 5 is a block diagram of an exemplary home network attached storage (NAS) server including the secure key management system of FIG. 4.

FIG. 5 shows an exemplary media server key manager 500, which might be used for a home media server application. As shown in FIG. 5, decryption/encryption engine 402 might be implemented as AES core 502, which operates in accordance with the Advanced Encryption Standard (AES). Also as shown in FIG. 5, key processing engine 404 might be implemented as a direct memory access (DMA) processor, shown as DMA processor 504. In other embodiments, key processing engine 404 might be any module that moves data efficiently between non-volatile memory 512 and AES Core 502 and key memory 510 without making the data available to AP 150, such as a function built into TMA 100.

As described herein, intermediate storage is provided in memory 110 for storing incoming streaming data from network port 131 or while streaming out data from disk array 141 to network port 131. Control traffic arriving from network port 131 is also managed in memory 110. Shared memory 110 might include one or more buffer queues (shown as 661 in FIG. 6) to manage simultaneous data streams.

As described herein, NAS system 10 might simultaneously receive data from multiple sessions to be i) stored to disk array 141, ii) played out to devices on a home network (e.g., via network port 131), or iii) used for control traffic. Buffer queues 661 are employed to manage the various traffic flows. TMA 100 is employed to manage the traffic and bandwidth of shared memory 110. Data memory 508 provides intermediate storage, for example, for queuing or buffering encrypted payload data to be decrypted or the decrypted payload data.

Non-volatile key memory 512 might be used to store a set of one or more master keys. In some embodiments, to enhance security, non-volatile key memory 512 can only be written once (e.g., key memory 512 is a one-time programmable (OTP) memory). The master keys stored in non-volatile key memory 512 are used to decrypt keys that are stored in external memory (e.g., flash memory 152) by the media server manufacturer. The master keys are also programmed to non-volatile key memory 512 during the device manufacturing process.

In some embodiments, read access to the master keys in non-volatile key memory 512 is limited to DMA Key Processing Engine 504 (to the exclusion of AP 150). For example, as shown in FIG. 5, arbiter 507 might grant access of AHB Bus 520 to either AP 150 or DMA Key Processing Engine 504 at any given time, so that AP 150 cannot access AHB Bus 520 while DMA Processor 504 is reading decrypted keys from one of volatile key memory 510 or the output FIFO 663 (FIG. 6) of AES Core 502.

Due to the cost associated with memories employed by non-volatile key memory 512 and key memory 510, the amount of on-chip memory space might be limited. By storing encrypted keys in an optional external memory (e.g., flash memory 152), the total number of device specific keys that can be stored is extended. The device specific keys are encrypted, and the key (to decrypt the keys stored in flash memory 152) is programmed in non-volatile key memory 512.

When a decryption operation requiring a key is to be performed, AP 150 requests that DMA Processor 504 move a key from either non-volatile key memory 512 or key memory 510 to AES core 502. Once the key transfer is done, AP 150 inputs the data that are to be decrypted to AES core 502. Arbiter 507 then grants DMA Processor 504 access to AHB Bus 520, to the exclusion of AP 150. AES core 502 decrypts the key data, and the decrypted key is moved by DMA Processor 504 to volatile key memory 510. Arbiter 507 prevents access by AP 150 to the decrypted key stored in key memory 510.

In some embodiments, such as shown in FIG. 5, key memory 510 might be a volatile memory (e.g., random access memory), in which case the decrypted keys are automatically removed from memory when NAS system 10 is powered down. In other embodiments, key memory 510 might be an additional non-volatile memory. Thus, as described with regard to FIG. 5, embodiments of the present invention ensure that the master key is secure in non-volatile key memory 512 and will be accessed in a secure manner in order to decrypt any further keys.

DMA Processor 504 might also process the keys by performing pre-determined logical operations (i.e., XOR with another datum, or the like). The operand and the operators are specified by AP 150, however, at no time does AP 150 have access to any decrypted keys. Instead, AP 150 is provided a pointer to the decrypted key. When the decrypted key is to be used for decryption, AP 150 provides the pointer to DMA Processor 504, which moves the decrypted key from key memory 510 to the AES core 502.

In some embodiments, DMA processor 504 includes one or more DMA channels. For example, one of the DMA channels (i.e., CH0) might be dedicated to handling internal transfers of keys among the AES core 502, non-volatile key memory 512 and key memory 510. When an encrypted key stored in external memory, such as flash memory 152 is to be decrypted, AP 150 configures DMA CH0 with the following parameters: i) Source Addr=the address of the device key in non-volatile key memory 512, and ii) Dest Address=the address of key memory 510. When the DMA channel is thus programmed, DMA processor 504 sets access to AES output FIFO 663 (shown in FIG. 6). For example, DMA processor 504 sets a signal to a predetermined level (e.g., signal "dma_aes_allow_fifo_read" might be set to a logic low value). When this signal is set to the predetermined level (e.g., logic low), AES core 502 prevents any read of output FIFO 663 until the signal is set to another logic level (e.g., logic high). Thus, AP 150 is prevented from accessing AES output FIFO 663, which prevents any other process or user from obtaining the decrypted key.

Once DMA processor 504 completes the transfer of the master key to AES core 502, arbiter 507 is configured to allow AP 150 to read external flash memory 152 (e.g., via TMA 100) and load the encrypted device key in AES Input FIFO 665 (shown in FIG. 6), which enables the decryption operation in AES core 502. When AES core 502 completes the operation, AP 150 configures DMA processor 504 to read the decrypted key from AES output FIFO 665 and store it in internal key memory 510. For example, to store the decrypted key in key memory 510 when DMA processor 504 is the master of AHB bus 520, as enabled by arbiter 507, DMA processor 504 sets a control signal to a predetermined logic level, for example, a control signal "dma_aes_allow_fifo_read" might be set to logic high. DMA processor 504 reads the content of output FIFO 663 and stores it in internal key memory 510.

Figure 6:
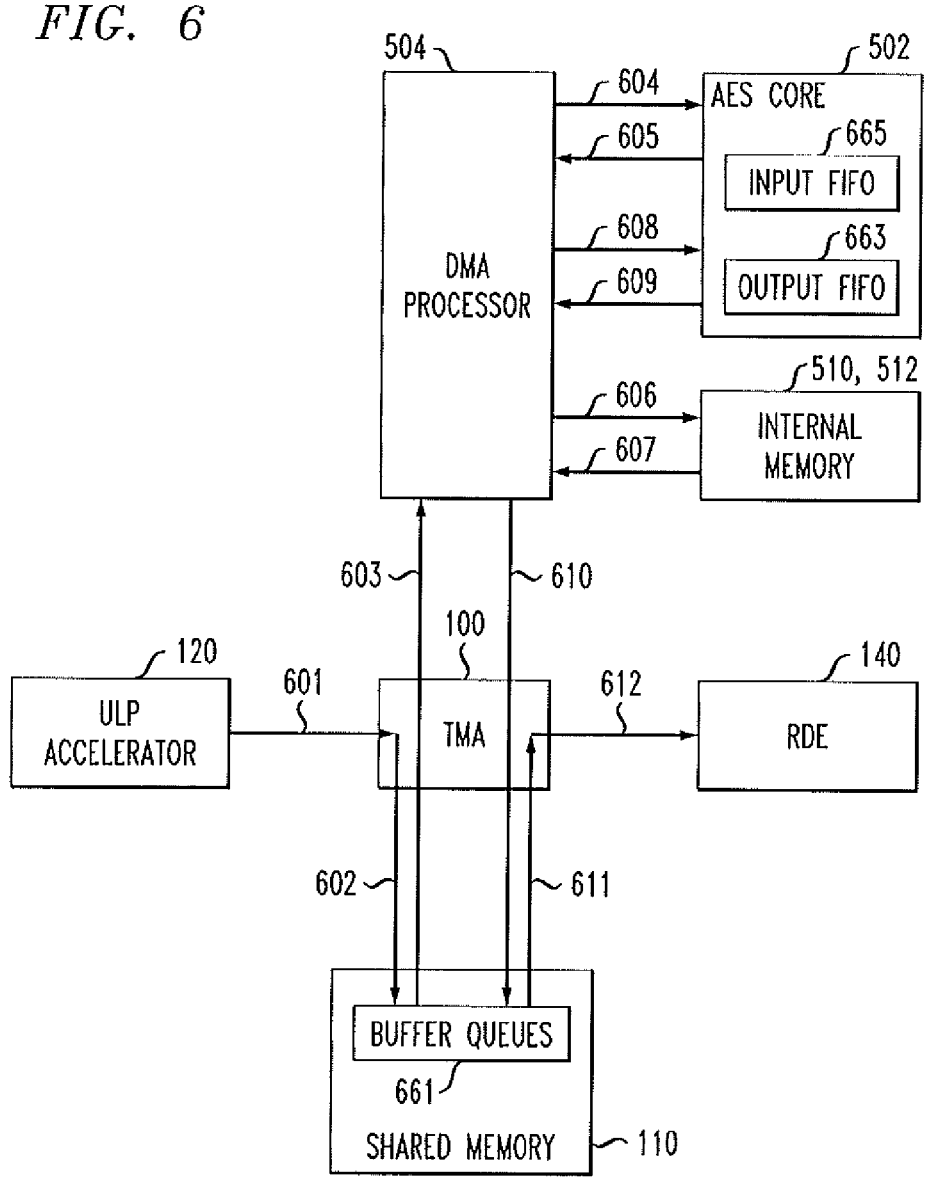
FIG. 6 is a data flow diagram showing exemplary data flows during a key decryption and data decryption operation in accordance with embodiments of the present invention.

FIG. 6 is a data flow diagram showing exemplary data flows during a key decryption and data decryption operation. Note that FIG. 6 only shows the subset of modules of FIG. 5 that are involved in the exemplary data flows discussed herein. This does not exclude elements of the system from participating in other data flows for other purposes.

As shown in FIG. 6, in data flow 601, one or more packets of data are received (e.g., received from network port 131, by way of the upper layer protocol (ULP) accelerator 120, which optionally offloads routine network, transport and application layer protocol processing from AP 150), and the received data packets are provided to traffic manager/arbitrator (TMA) 100. In data flow 602, TMA 100 stores the received data packets in intermediate buffer queues 661 in shared memory 110. The received data packets might be re-assembled and, in some embodiments, translated to accommodate the internal bus width of the NAS system 10, for example, AHB data bus 172.

In data flow 603, shared memory 110 outputs the data to be decrypted from the buffer queues 661 to DMA processor 504 via TMA 100. In data flow 604, DMA processor 504 moves the master key (from non-volatile key memory 512) and an encrypted device key (for example from one of flash memory 152 or data memory 508) to AES core 502 (e.g., input FIFO 665), and AES core 502 decrypts the device key using the master key. In data flow 605, once the device key is decrypted, DMA processor 504 reads the decrypted device key from ABS output FIFO 663.

In data flow 606, DMA processor 504 delivers the decrypted device key to internal key memory 510, where it is stored. In data flow 607, DMA processor 504 retrieves the decrypted device key from internal key memory 510. In data flow 608, DMA processor 504 delivers the encrypted packet data to AES core 502 for decryption, along with the decrypted device key. This enables AES core 502 to perform the decryption operation on the encrypted packet data using the decrypted device key.

In data flow 609, DMA processor 504 reads the decrypted data from AES output FIFO 663. In data flow 610, DMA processor 504 delivers the decrypted data to TMA 100, which transmits the decrypted data to a buffer queue 661 in shared memory 110. In data flow 611, TMA 100 retrieves the decrypted data from the buffer queue 661 at an appropriate rate for forwarding the data to RDE 140. In data flow 612, TMA 100 delivers the decrypted data to RDE 140 for storage in disk array 141.

Figure 7:
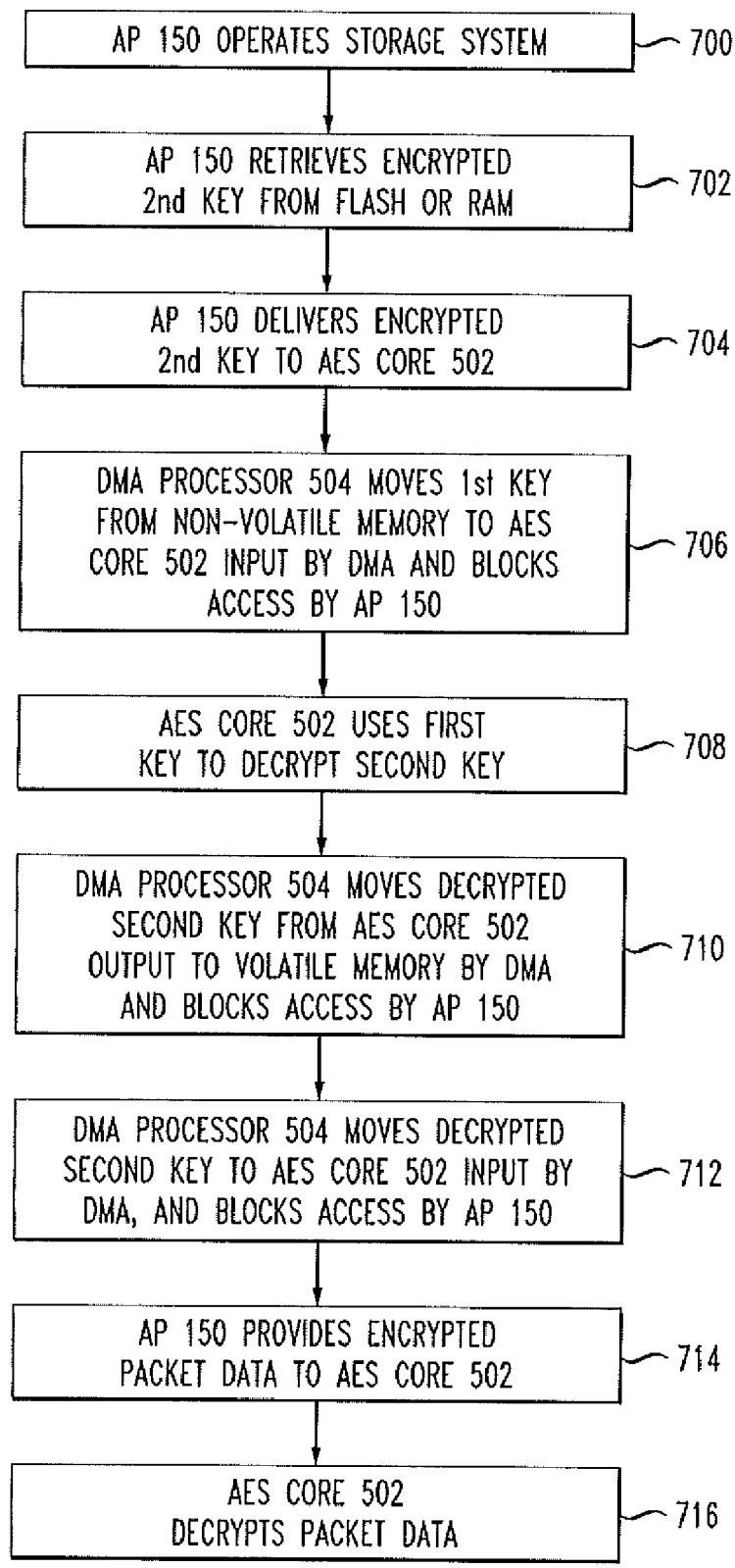
FIG. 7 is a flow chart showing a method of decrypting data in accordance with exemplary embodiments of the present invention.

FIG. 7 is a flow chart of a method performed by NAS system 10. As shown in FIG. 7, at step 700 AP 150 controls operation of NAS system 10. For example, AP 150 might control DMA processor 504. At step 702, AP 150 retrieves an encrypted second key (the device key) from one of flash memory 152 or shared memory 110, in which the device key is stored.

At step 704, AP 150 delivers the encrypted second key to AES core 502. At step 706, DMA processor 504 moves a first key (the master key) from non-volatile memory 512 to AES core 502, for example by using direct memory access (DMA), while preventing AP 150 from accessing the first key. At step 708, AES core 502 uses the first key to decrypt the encrypted second key.

At step 710, DMA processor 504 moves the second key to key memory 510 from AES core 502, while preventing AP 150 from accessing the decrypted second key. At step 712, DMA processor 504 moves the second key from key memory 510 to AES core 502, while preventing AP 150 from accessing the decrypted second key. At step 714, AP 150 delivers the encrypted packet data to AES core 502 for decryption. At step 716, AES core 502 decrypts the encrypted packet data using the second key.

One of ordinary skill in the art would understand that the exemplary system and data flows described above can be extended to multiple levels of keys. The decrypted device key might be delivered by DMA processor 504 to the input of AES core 502 for decrypting an additional key, the additional key in turn used to decrypt the encrypted payload data.

Although an example is described above in which the decrypted device key is stored in the key memory 510, in other embodiments, the decrypted device key is re-encrypted with a different key (e.g., another master key stored in non-volatile key memory 512) by AES core 502 before ABS core 502 stores the key in key memory 510. Although the examples described above include an encryption/decryption engine 402 that acts as the decryption engine, for the purpose of performing the decryption operations described above, a standalone decryption engine that provides the decryption functions might alternatively be used.

Described embodiments provide efficient data movement for encryption/decryption, and efficient key protection including hardware for decryption and storage of decrypted device keys. The optional inclusion of non-volatile memory 512 and key memory 510 allows a designer to extend the number of keys supported. Thus, the number of keys supported is variable.

Described embodiments provide a multi-level key management and processing engine that supports a master key to unlock device specific keys on a chip. The master keys might typically be programmed by the manufacturer of the device at the time of production, so that each vendor can select one or more master keys. Hardware acceleration of key management, encryption and decryption with minimal control processor intervention might provide improved performance while also providing the ability to hide the keys from the control processor (AP 150) to avoid hackers from modifying the boot up code to access any protected keys.

Although the invention has been described in terms of exemplary embodiments, it is not limited thereto. Rather, the invention should be construed broadly, to include other variants and embodiments of the invention, which might be made by those skilled in the art without departing from the scope and range of equivalents of the invention.

What is claimed is:

1. A server system for transmitting and receiving data packets corresponding to one or more streaming data sessions between one or more playback devices over at least one network connection, the server system comprising:
    a protocol accelerator adapted to, for received data packets corresponding to the one or more data sessions, (i) extract one or more header fields of the received data packets, (ii) perform a lookup, based on the extracted one or more header fields, to determine a destination for the received data packets, and (iii) provide the received data packets to the destination, and for data to be transmitted, (i) group the data to be transmitted into data packets, [ii) generate one or more header fields for the data packets, and (iii) provide the data packets to the at least one network connection;
    a control processor adapted to perform processing on (i) received data packets and (ii) data to be transmitted;
    a memory arbiter adapted to manage accesses to a shared memory, wherein the shared memory is adapted to (i) buffer received data packets and data to be transmitted, and (ii) store one or more keys corresponding to the one or more data sessions;
    a storage medium adapted to store media files corresponding to the one or more data sessions;
    a key manager comprising: (i) a first memory for storing at least one master key of the server, (ii) a second memory for storing one or more keys corresponding to the one or more data sessions, and (iii) an encryption/decryption processor adapted to encrypt and decrypt data packets, (iv) a direct memory access (DMA) processor, and (v) a bus arbiter adapted to exclusively couple a bus of the key manager to one of:
    (a.) the control processor, and (b) the DMA processor, wherein the DMA processor is adapted to (1) transfer the one or more keys between the encryption/decryption processor and the second memory and (2) provide a signal to the encryption/decryption processor when data is present for the encryption/decryption processor to decrypt,
    wherein file encryption/decryption processor is further adapted to: (i) responsive to the signal, perform the decryption, (ii) provide a signal to the bus arbiter, and (iii) provide, once the bus arbiter provides exclusive bus access to the encryption/decryption processor, decrypted data to the second memory.

2. The server system of claim 1, wherein the encryption/decryption processor is further adapted to:
    i) encrypt, using the at least one master key, the one or more keys corresponding to the one or more data sessions, and provide the encrypted one or more keys to the memory arbiter for storage to the shared memory, and
    ii) retrieve the encrypted one or more keys from the shared memory by way of the memory arbiter, and decrypt, using the at least one master key, the encrypted one or more keys, wherein the decrypted one or more keys are not accessible to modules outside of the key manager.

3. The server system of claim 2, wherein the encryption/decryption engine is further adapted to employ the decrypted one or more keys to decrypt data packets for storage on the storage medium and encrypt data packets for transmission to the one or more playback devices.

4. The server system of claim 2, wherein the second memory of the key manager is adapted to store the decrypted one or more keys.

5. The server system of claim 1, wherein the invention is implemented in a
    monolithic integrated circuit chip.

6. The server system of claim 1, wherein the storage medium is a redundant array of inexpensive disks (RAID).

7. The server system of claim 1, wherein
    the shared memory is implemented as a double data rate synchronous dynamic random access memory (DDR SDRAM);
    the first memory is implemented as a one-time programmable (OTP) memory; and
    the second memory is implemented as one of a random access memory (RAM) and a flash memory.

8. A method of processing, by a media server, data packets corresponding to one or more streaming data sessions between the media server and one or more playback devices over at least one network connection, the method comprising:
    receiving, by a protocol accelerator, encrypted data packets corresponding to the one or more streaming data sessions, wherein the encrypted data packets include (i) an encrypted device key corresponding to the data session, and (ii) encrypted payload data;
    extracting, by the protocol accelerator, the encrypted device key from the received data packet;
    providing, by the protocol accelerator, (i) the encrypted device key to a control processor, and (ii) the encrypted data to a memory arbiter for buffering in a shared memory;
    configuring, by a bus arbiter, a bus of the media server to allow access by a decryption processor, to the exclusion of the control processor;

retrieving, by the decryption processor via the bus of the media server, a master key of the media server from a non-volatile memory using direct memory access (DMA);

providing, by the control processor, the encrypted device key to the decryption processor;

decrypting the encrypted device key, by the decryption processor, using the master key;

storing, by the decryption processor, the decrypted device key in a volatile memory using DMA;

retrieving, by the decryption processor via the memory arbiter, the payload data from the shared memory;

configuring, by the bus arbiter, the bus to allow access by the control processor to the exclusion of the decryption processor;

decrypting, by the decryption processor, the payload data using the decrypted device key;

providing, by the decryption processor, the decrypted payload data to one of (i) a storage medium and (ii) a network connection.

9. The method of claim 8 further comprising:

allocating, by the memory arbiter, one or more first-in, first-out (FIFO) buffer queues in the shared memory to a given data session;

providing, by the memory arbiter, received payload data to the one or more FIFO buffer queues;

providing, by the memory arbiter, payload data from the one or more FIFO buffer queues to the decryption processor for decryption;

providing, by the decryption processor via the memory arbiter, decrypted payload data to another of the one or more FIFO buffer queues in the shared memory; and providing, by the memory arbiter, the decrypted payload data to the storage medium.

10. The method of claim 8, further comprising:

for a transmit session, grouping, by at least one of the control processor and the protocol accelerator, data read from the storage medium into one or more corresponding data packets for transmission over the network connection to one or more playback devices; and for a receive session, re-assembling, by at least one of the control processor and the protocol accelerator, data packets received by the media server from one of the playback devices into a single media session for storage on the storage medium.

11. The method of claim 10, further comprising:

for receive sessions:

extracting, by the protocol accelerator, one or more header fields of each received data packet;

determining, by the protocol accelerator based on the extracted one or more header fields, a queue identifier (QID) for the received data packet;

routing the received data packet, based on the determined QID, to one of i) the storage medium if the QID corresponds to a previously established data session and ii) the control processor if the QID is not recognized.

12. The method of claim 10, further comprising: for transmit sessions:

generating, by the memory arbiter, a data transfer request to the protocol accelerator;

retrieving, by the protocol accelerator, responsive to the transfer request, transmit data from one of the storage media and the control processor;

grouping, by the protocol accelerator, the transmit data into one or more data packets;

providing, by the protocol accelerator, the one or more data packets to the network connection.

13. The method of claim 8, wherein the decryption processor operates in accordance with the Advanced Encryption Standard (AES).

14. The method of claim 8, further comprising:

encrypting, by the decryption processor, the decrypted device key using a second master key;

storing, by the decryption processor, the encrypted device key to the storage medium.

15. The method of claim 8, wherein the method is implemented by a machine executing program code encoded on a non-transitory machine-readable storage medium.

* * * * *